United States Patent Office 3,432,482
Patented Mar. 11, 1969

3,432,482
PROCESS FOR THE PREPARATION OF POLYMER
Toshio Ohfuka, Katsumi Shirode, and Yasushi Ichikawa, Fuji-shi, Japan, assignors to Asahi Kasei Kogyo Kabushiki Kaisha, Osaka, Japan, a corporation of Japan
No Drawing. Filed May 27, 1965, Ser. No. 459,430
Claims priority, application Japan, May 29, 1964, 39/30,055; June 30, 1964, 39/36,456
U.S. Cl. 260—85.5
Int. Cl. C08f 1/62, 1/11, 3/76

6 Claims

ABSTRACT OF THE DISCLOSURE

A polymer is prepared by forming an aqueous dispersion containing an ethylenically unsaturated polymerizable compound, hydroxyurea-N-sulfonic acid or a water-soluble salt thereof in an amount of 0.01–10%, based on the weight of said polymerizable compound and 0.01–30%, based on the weight of said polymerizable compound of at least one inorganic oxidizable sulfoxy compound, adjusting the aqueous dispersion to a pH of 1–7 and maintaining same at 10–100° C.

---

This invention relates to a process for preparing new and useful polymeric materials. More particularly this invention relates to a process which comprises polymerizing an ethylenically unsaturated compound by contacting the same with hydroxyurea-N-sulfonic acid or salts thereof and an oxidizable sulfoxy compound in an aqueous medium. This process includes the polymerization of either a single compound or mixture of such compounds.

In recent years, many kinds of polymeric materials have been prepared by polymerization or copolymerization of polymerizable monomers in synthetic fiber and plastics industries and many valuable commercial articles have been extensively produced thereby. The ethylenic compounds occupy important roles in these industries and many valuable articles are produced by polymerization or copolymerization of these compounds with various combinations. It is highly important for high polymer industries to obtain polymers of superior quality rapidly and efficiently on a large commercial scale. The present invention provides a highly advanced and improved process for preparing such superior polymers.

An important development in the field of polymerization initiators is the use of redox systems, in which oxidizing and reducing agents (each thermally stable) react to form free radicals at low or moderate temperatures. It is this rapid production of free radicals from stable compounds which accounts for the present technical importance of redox initiation, in contrast to the production of free radicals by thermal dissociation of the initiator which must either be unstable at room temperature or else be used at elevated temperatures.

Various systems have been studied and disclosed in the prior art, but they often have a slow rate of polymerization, are uneconomical and cannot be applied efficiently to a large commercial scale production. Initiators which give polymers with a rapid rate of polymerization and with economical yield are desired. Even if polymers are prepared with a rapid rate and in good yield, the commercial value of the polymeric materials is lowered when the polymer has inferior qualities and undesirable qualities, such as being nonhomogeneous, discoloration on heating and so on. In particular, acrylonitrile polymers for preparing acrylic synthetic fibers are often discolored by heating, which may be caused by the radicals of the polymerization initiators. Initiators hitherto used have rarely been satisfactory with respect to both the whiteness of the polymer and the rate of polymerization.

In the present invention, the effect of hydroxylamine-N-sulfonic acid used in U.S. Patent No. 3,174,954 is further enhanced by substituting a —CONH$_2$ group for the active hydrogen atom of said acid.

However, when acrylonitrile is polymerized with hydroxyurea-N-sulfonic acid or salts thereof in accordance with the present invention, the polymer obtained is very high in whiteness and much more stable than other polymers (polymerized with other conventional initiators) when dried at elevated temperature, and treated with dry heat or steam heat, moreover, its polymerization rate is practically satisfactory.

Hydroxyurea-N-sulfonic acid or salts thereof can be prepared by the reaction of hydroxylamine sulfonates with cyanic acid according to the following equation.

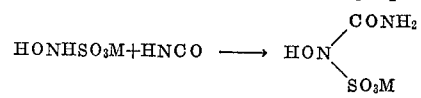

In the present invention, alkali metal salts such as the Na, K, and NH$_4$ salts are generally used for hydroxyurea-N-sulfonates. The amount of hydroxyurea-N-sulfonic acid or a salt thereof employed in the polymerization including copolymerization in the present invention is usually in the range of 0.01 to 10% (preferably 0.2 to 2%) by weight based on the total weight of the monomers.

It is preferred to employ hydroxyurea-N-sulfonic acid or salts thereof alone as an oxidizing agent in the polymerization and copolymerization, however, other conventional oxidizing agents, such as hydrogen peroxide, benzoyl peroxide, percarbonate, water-soluble salts of perdisulfuric acid and hydroxylamine-N-sulfonates, can be used in combination with hydroxyurea-N-sulfonic acid or a salt thereof to the extent of 80 mol percent of the oxidizing agent. Their use depends upon the polymerization rate and the properties of the polymers. As reducing agents, there are included inorganic oxidizable sulfoxy compounds, sulfur dioxide, alkali metal sulfite, bisulfite, hydrosulfite, thiosulfate, and ammonium bisulfite, and a mixture of two or more of said compounds. As salts, desirable salts are water soluble salts such as the Na, K and NH$_4$ salts. The amount of reducing sulfoxy compound used together is usually 0.01 to 30% by weight of the monomers and is determined by the polymerization conditions and the properties of the polymers. The addition of dispersing agents, polymerization regulators, pigments or dyes and other substances is not essentially limited by the purpose of the present invention. Dispersing agents include long chain alkyl sulfates and sulfonates. Polymerization regulators include mercaptans such as dodecyl mercaptan, thioglycol, etc.

The polymerization catalysts in the present invention are desirably water soluble salts. Polymerization methods include aqueous solution polymerization, emulsion polymerization, suspension polymerization and the polymerization applied to aqueous medium such as water-organic solvent, etc. Polymerization temperatures in the present invention are within the range from 10° to 100° C., and preferably in the range of 30° to 70° C. Polymerization processes applicable are batch polymerization process, semi-continuous and continuous polymerization processes.

The process of the present invention can be conducted at pH values ranging from 1 to about 7. However, it is preferable to use pH values in the range of about 1.5 to 4.0. The pH value of the aqueous medium may be adjusted by sulfuric acid, phosphoric acid, nitric acid and acetic acid. The ratio of monomer to aqueous medium is in the range of 1:2 to about 1:20. However, it is preferable that the ratio be in the range of 1:2 to about 1:7. The selection of a particular ratio will depend to a considerable extent on the thermal nature of the polymerization reaction, and the viscosity of the polymerization mixture. In conducting the polymerization in aqueous medium it ofen happens that the presence of oxygen may have an undesirable effect on the rate of polymerization, and in such cases it is desirable to displace air from the polymerization vessel by means of an inert gas such as nitrogen, carbon dioxide, and so on. The air may be removed by a simple flushing process or by repeatedly introducing the inert gas under pressure and purging until the oxygen originally present is substantially eliminated.

The polymerizable ethylenically unsaturated compounds include acrylic acid, α-chloroacrylic acid, α-bromoacrylic acid, methacrylic acid; acrylates such as methyl methacrylate, methoxy methacrylate, ethyl methacrylate, butyl methacrylate, or methyl acrylate, ethyl acrylate, butyl acrylate, methyl α-chloroacrylate, ethyl α-chloroacrylate, butyl α-chloroacrylate; vinyl chloride, vinyl fluoride, vinyl bromide, vinylidene chloride acrylonitrile; methacrylonitrile; acrylamide and methacrylamide; α-chloroacrylamide or alkyl-substituted products thereof; methyl vinyl ketone; vinyl carboxylic acid and vinyl carboxylates such as vinyl acetate, vinyl chloroacetate, vinyl propionate, vinyl stearate; N-vinylimides, such as N-vinyl phthalimide, N-vinyl succinimide; methylene malonic acid ester, N-vinyl carbazole; vinyl furane; alkyl vinyl esters; vinyl sulfonic acids: ethylene α,β-dicarboxylic acids, anhydrides or derivatives thereof; vinylpyridines such as 2-vinylpyridine, 4-vinylpyridine, 2-methyl-5-vinylpyridine; 1-vinylimidazoles and alkyl-substituted 1-vinylimidazoles, such as 2-, 4-, or 5-methyl-1-vinylimidazole, and other

containing polymerizable materials. These compounds are effectively polymerized either alone or in various combinations of two or more selected monomers. In addition, other monomeric ethylenic compounds, which either fail to polymerize or polymerize only with difficulty in the presence of free radical catalysts, can be employed as copolymerizable modifiers such as fumaric esters, maleic esters, N-vinylmaleimide.

The present invention will be further explained in the following examples, and although in these examples certain definite conditions of tamperature, pressure, monomer-water ratios, catalyst concentrations, dispersing agent concentration and the like will be referred to, it is to be understood that these values can be varied within the limits of this invention without departing from the spirit and scope thereof. It should be emphasized, however, that the selection of specific conditions within the limits of the invention for the polymerization of any monomer or combination of monomers is governed to a consideable extent by the properties peculiar to the individual monomer or combinations of monomers and by the properties desired in the polymeric products. The values of percent and parts hereinafter represent percent and parts by weight unless otherwise stated.

Example 1

In a glass ampoule of approximately 100 ml. capacity are placed 100 parts of water, 10 parts of acrylonitrile, 0.1 part of potassium hydroxyurea-N-sulfonate, 0.5 part of potassium bisulfite and 0.2 part of sulfuric acid, and the mixture is cooled to 5° C. After the air in the ampoule is displaced with nitrogen, the ampoule is sealed by fusion. Polymerization is carried out by shaking the ampoule for 4 hours in a thermostat kept at 55° C. Then, the ampoule is cooled and opened, and 9.5 parts of the white product is separated by filtration, washed with water and dried at 50° C. The reduced viscosity of the polymer ($\eta$ sp./C.) is 1.76, which is measured at a polymer concentration of 0.2 g./100 ml. dimethyl formamide at 35° C. The polymer is dissolved in 70% purified nitric acid at 0° C., regenerated in 35% nitric acid, washed with water, dried, and subjected to dry heat treatment at 180° C. for 10 min. and at 135° C. in superheated steam for 10 min., respectively. The whiteness of the polymer is shown in Table 1. It is calculated by reflection (assuming the value of magnesium oxide as 100) by using a spectrophotometer.

In order to compare the product with conventional catalysts polymerization is carried out wherein the polymerization conditions are the same as above, except that potassium hydroxyurea-N-sulfonate is replaced by ammonium persulfate. As the result, 9.6 parts of a polymer with reduced viscosity of 1.65 is obtained. The polymer is treated in the same manner as above, and the results of whiteness measured are shown in Table 1, which suggest the superiority of this invention. If the whiteness is below 90 in value, a considerable coloration is observed by appearance.

TABLE 1

| Treatment | Whiteness | |
|---|---|---|
| | The present invention | Conventional process |
| Dried after polymerization (not heat-treated) | 103 | 100 |
| Regenerated in nitric acid (not heat-treated) | 103 | 98 |
| Treated by steam heat at 135° C | 95 | 84 |
| Treated by dry heat at 180° C | 87 | 76 |

In order to determine the polymerization rate under the above conditions, the same compositions are placed in 6 ampoules and the polymerization is conducted as mentioned above. After a certain period polymerization is stopped, and the polymer is separated by filtration, washed and dried. The reduced viscosities and the yields of the polymer are measured. Polymerization with ammonium persulfate is also carried out for comparison.

TABLE 2

| Catalyst polymerization time (min.) | Potassium hydroxyurea-N-sulfonate | | Ammonium persulfate | |
|---|---|---|---|---|
| | Reduced viscosity ($\eta$ sp./C.) | Yield (parts) | Reduced viscosity ($\eta$ sp./C.) | Yield (parts) |
| 15 | 2.36 | 3.8 | 2.30 | 4.3 |
| 30 | 2.38 | 5.4 | 2.25 | 7.0 |
| 45 | 2.34 | 6.6 | 2.08 | 8.1 |
| 60 | 2.29 | 7.4 | 1.95 | 8.8 |
| 120 | 1.99 | 9.0 | 1.81 | 9.5 |
| 240 | 1.76 | 9.5 | 1.65 | 9.6 |

As a result, it is shown that the polymerization rate and its degree are satisfactory for commercial production.

Example 2

In a glass ampoule of approximately 100 ml. capacity are placed 100 parts of water, 9.5 parts of acrylonitrile, 0.5 part of methylemethacrylate, 0.1 part of sodium bisulfite and 0.2 part of sulfuric acid, and the ampoule is cooled to 5° C. and sealed. Polymerization is carried out in the same manner as Example 1 and 9.7 parts of a white polymer are obtained. The reduced viscosity is 1.80 measured in dimethyl formamide. As in example 1, a control experiment is carried out with ammonium persulfate, and 9.7 parts of a polymer are obtained, and the reduced viscosity of the polymer is 1.70. It is then heat-treated in the same manner as in Example 1 and the results are shown in Table 3, which also suggest the superiority of this invention.

TABLE 3

| Treatment | Whiteness | |
|---|---|---|
| | The present invention | Conventional process |
| Dried after polymerization (not heat-treated) | 102 | 98 |
| Regenerated in nitric acid (not heat-treated) | 102 | 97 |
| Treated by wet heat at 135° C | 98 | 84 |
| Treated by dry heat at 180° C | 90 | 76 |

Example 3

In a glass ampoule of approximately 100 ml. capacity are placed 100 parts of water, 9.0 parts of acrylonitrile, 0.5 part of acrylamide, 0.5 part of methyl acrylate, 0.1 part of potassium hydroxyurea-N-sulfonate, 0.5 part of potassium bisulfite and 0.2 part of sulfuric acid, and the ampoule is cooled to 5° C. and sealed. Polymerization is carried out in the same manner as in Example 1 to give 9.7 parts of a polymer of very high whiteness. The reduced viscosity of the polymer in dimethyl formamide is 1.65.

The reduced viscosity of the polymer obtained from a control polymerization with ammonium persulfate is 1.60 and the yield is 9.7 parts. It is then heat-treated in the same manner as the above examples and the results are shown in Table 4, which also suggest the superiority of this invention.

TABLE 4

| Treatment | Whiteness | |
| --- | --- | --- |
| | The present invention | Conventional process |
| After polymerization (not heat-treated) | 103 | 100 |
| After regenerated in nitric acid (not heat-treated) | 103 | 97 |
| Treated by wet heat at 135° C | 98 | 88 |
| Treated by dry heat at 180° C | 90 | 80 |

Example 4

The following solutions are prepared; (A) 1 part of potassium hydroxylamine - N - monosulfonate in 1000 parts of water, (B) 1.28 parts of potassium hydroxyurea-N-sulfonate in 1000 parts of water. In six ampoules are placed 100 parts of A, 80 parts of A and 20 parts of B, 60 parts of A and 40 parts of B, 40 parts of A and 60 parts of B, and 100 parts of B, respectively. These mixtures respectively correspond to 0, 20, 40, 60 and 100 mol percent of potassium hydroxyurea - N - sulfonate in the oxidizing agent. To each ampoule are added 10 parts of acrylonitrile, 0.5 part of potassium bisulfite and 0.2 part of sulfuric acid, and the polymerization is carried out as in the preceding example. In this case, 0 mol percent of potassium hydroxyurea - N - sulfonate is equivalent to a blank test which corresponds to a conventional system of the combination of potassium hydroxylamine-N-sulfonate and potassium bisulfite. The reduced viscosity of the polymer measured in dimethyl formamide is shown in Table 5. The polymer is treated in the same manner as in Example 1. The results are shown in Table 5.

TABLE 5

| Hydroxy urea potassium sulphonate (mol percent) | Yield of polymer (p.) | Viscosity of solution ($\eta$ sp./ C.) | Whiteness | | | |
| --- | --- | --- | --- | --- | --- | --- |
| | | | Dried after polymerization | After regenerated in nitric acid | After wet heat treatment | After dry heat treatment |
| 100 | 9.5 | 1.80 | 103 | 103 | 95 | 87 |
| 60 | 9.5 | 1.72 | 103 | 103 | 95 | 86 |
| 40 | 9.5 | 1.70 | 103 | 103 | 95 | 86 |
| 20 | 9.5 | 1.66 | 102 | 101 | 90 | 84 |
| 0 | 9.6 | 1.66 | 100 | 98 | 87 | 82 |

The above results show that the amount of potassium hydroxylamine-N-sulfonate as oxidizing agent has no remarkable effect on the whiteness when its mol percent to potassium hydroxyurea-N-sulfonate is below 80%

Example 5

In a glass ampoule are placed 1 part of sodium lauryl sulfate, 10 parts of styrene, 0.08 part of potassium hydroxyurea-N-sulfonate, 0.8 part of sodium sulfite and 100 parts of water and the pH of the solution is adjusted to 3.0 with sulfuric acid. The ampoule is cooled at 5° C. and after the air in the ampoule is displaced with nitrogen by flushing, is sealed. Polymerization is carried out with shaking in a thermostat at 60° C. for 2 hours and then at 95° C. for 2 hours. Then, the ampoule is cooled and opened, and the white suspension is added to 100 parts of water containing 5 parts of magnesium chloride to precipitate styrene polymer. The polymer is washed with water, filtered and dried to 6 parts of white product which give colorless and transparent thermoplastic material by fusion.

Example 6

2 parts of the sodium salt of sulfonated paraffin white oil, 0.05 part of potassium hydroxyurea-N-sulfonate, and 1.0 part of potassium bisulfite are added to 100 parts of water and the pH is adjusted to 2.5 with sulfuric acid. The solution is placed in a glass ampoule, cooled at $-20°\sim-28°$ C. in a Dry Ice-methanol bath, and 10 parts of vinyl chloride are added. After the air in the ampoule is displaced with nitrogen, the ampoule is sealed. Then the ampoule is placed in a thermostat at 40° C. and polymerization is carried out with shaking for 2 hours. The polymer is filtered off, washed with water and dried to obtain 9.7 parts of white vinyl chloride polymer, which gives a colorless and transparent thermoplastic material by fusion.

Example 7

A solution is prepared by adding 0.8 part of potassium hydroxyurea-N-sulfonate and 10 parts of sodium sulfite to 1000 parts of water and the pH is adjusted to 2.5 with sulfuric acid. 100 parts of the above solution, together with acrylonitrile and the copolymerized monomers shown in Table 6 (10 parts in total), are placed in a glass ampoule. After the air in the ampoule is displaced with nitrogen, polymerization is carried out with shaking for 4 hours in a thermostat kept at 55° C. (In Experiment No. 5, Table 6 below, the ampoule is sealed after cooling at $-20°$ C.). Then, the ampoule is cooled and opened, the polymer obtained is filtered off, washed with water, and dried. The results are shown in Table 6.

TABLE 6

| Experiment No. | Composition of polymers | Yield (p.) |
| --- | --- | --- |
| 1 | Acrylonitrile 8, vinyl acetate 2 | 9.0 |
| 2 | Acrylonitrile 8, methyl meta-acrylate 2 | 9.5 |
| 3 | Acrylonitrile 6, acrylic amide 2, vinyl acetate 2 | 8.5 |
| 4 | Acrylonitrile 8, 2-vinyl pyridine 2 | 9.0 |
| 5 | Acrylonitrile 5, vinyl chloride 5 | 8.0 |

Example 8

In a four-necked flask equipped with an effective stirring apparatus, thermometer, reflux condenser, and nitrogen inlet are placed 10 parts of vinylacetate, 100 parts of water, 0.06 part of potassium hydroxyurea-N-sulfonate, 1.0 part of sodium sulfite, and 2 parts of sodium dodecyl sulfate. Nitrogen gas is introduced into the flask to displace the air and polymerization is carried out with stirring in the bath at 40° C. After 1 hour, the contents are filtered off, washed with water, and dried to obtain powdered polyvinyl acetate.

Example 9

In the flask of Example 8 are placed 100 parts of water, 0.08 part of potassium hydroxyurea-N-sulfonate, 1.0 part of potassium bisulfite, and 5 parts of acrylamide recrystallized from water and 5 parts of vinylacetate (purified by distillation). The pH of the solution is adjusted to 3.0 with sulfuric acid. After the air in the flask is displaced with nitrogen, polymerization is carried out at 55° C. The contents become viscous, and after 2 hours are poured into methanol to precipitate a white polymer. The polymer is filtered off, washed with methanol, and dried to obtain 5.5 parts of copolymer of vinyl acetate-acrylamide, which is used for adhesives.

Example 10

In the flask of Example 8 are placed 100 parts of water, 0.1 part of potassium hydroxyurea-N-sulfonate, 1.0 part of potassium metasulfite, and 10 parts of methyl methacrylate purified by distillation. The pH of the solution is adjusted to 2.5 with sulfuric acid and polymerization is carried out at 55° C. for 2 hours. The contents are filtered off, washed with water, and dried to yield 9.8 parts of polymethyl methacrylate, which gives a thermoplastic transparent resin by fusion.

What is claimed is:
1. A process for preparing a polymeric material by polymerization, said process comprising forming an aqueous dispersion containing:
   (1) (a) acrylonitrile or (b) acrylonitrile admixed with a minor amount of at least one ethylenically unsaturated compound co-polymerizable therewith;
   (2) hydroxyurea-N-sulfonic acid or a water-soluble salt thereof in an amount of 0.01–10%, based on the weight of the acrylonitrile or the acrylonitrile admixed with a minor amount of said ethylenically unsaturated compound; and
   (3) at least one inorganic oxidizable sulfoxy compound selected from the group consisting of sulfur dioxide, sodium and potassium bisulfite, sodium and potassium sulfite, ammonium bisulfite, sodium and potassium hydrosulfite and sodium and potassium metabisulfite, said inorganic oxidizable sulfoxy compound being present in an amount of 0.01–30%, based on the weight of the acrylonitrile or the acrylonitrile admixed with a minor amount of said ethylenically unsaturated compound; adjusting the pH of the aqueous dispersion to a value from 1 to 7 and maintaining the aqueous dispersion at a temperature of from 10° C. to 100° C.

2. A process according to claim 1 wherein an oxidizing agent selected from the group consisting of hydrogen peroxide, benzoyl peroxide, percarbonate, a water-soluble salt of perdisulfuric acid, hydroxylamine-N-sulfonic acid and a water-soluble salt thereof, is used together with the hydroxyurea-N-sulfonic acid or water-soluble salt thereof to the extent of at least 80 mole percent of the molar amount of said hydroxyurea-N-sulfonic acid.

3. A process according to claim 1 wherein the inorganic oxidizable sulfoxy compound is sodium bisulfite.

4. A process according to claim 1 wherein the aqueous dispersion contains aceylonitrile alone.

5. A process according to claim 1 wherein the aqueous dispersion contains acrylonitrile in admixture with up to 15% by weight based on acrylonitrile of an ethylenically unsaturated compound co-polymerizable therewith.

6. A process according to claim 1 wherein the water-soluble salt of hydroxyurea-N-sulfonic acid is the ammonium, sodium or potassium salt of hydroxyurea-N-sulfonic acid.

References Cited
UNITED STATES PATENTS 2,768,156  10/1956  Bredereck et al. _____ 260—88.7
3,174,954  3/1965   Nakayama et al. _____ 260—85.5

JOSEPH L. SCHOFER, *Primary Examiner.*
HARRY WONG, Jr., *Assistant Examiner.*

U.S. Cl. X.R.

260—88.7, 63, 78.5, 79.3, 80.6, 80, 89.5, 80.3, 86.1, 86.3, 92.8, 87.5, 92.1, 89.7, 65, 85.7, 89.1, 78.4, 88.3, 80.72, 80.73, 80.81, 80.8, 80.77, 93.5